US007482056B2

(12) United States Patent
Yasuda

(10) Patent No.: US 7,482,056 B2
(45) Date of Patent: Jan. 27, 2009

(54) TRANSPARENT CONDUCTOR

(75) Inventor: Noriyuki Yasuda, Tokyo (JP)

(73) Assignee: TDK Corporation, Tokyo (JP)

( * ) Notice: Subject to any disclaimer, the term of this patent is extended or adjusted under 35 U.S.C. 154(b) by 254 days.

(21) Appl. No.: 11/392,671

(22) Filed: Mar. 30, 2006

(65) Prior Publication Data

US 2006/0222855 A1 Oct. 5, 2006

(30) Foreign Application Priority Data

Mar. 31, 2005 (JP) .......................... P2005-105252

(51) Int. Cl.

| | |
|---|---|
| ***B32B 5/16*** | (2006.01) |
| ***B32B 17/10*** | (2006.01) |
| ***B32B 27/14*** | (2006.01) |
| ***B32B 27/30*** | (2006.01) |
| ***B32B 27/32*** | (2006.01) |
| ***B32B 27/36*** | (2006.01) |
| ***B32B 27/38*** | (2006.01) |
| ***B32B 37/12*** | (2006.01) |

(52) U.S. Cl. ...................... 428/336; 428/412; 428/414; 428/426; 428/480; 428/522; 428/523; 156/330; 156/332

(58) Field of Classification Search ...................... None
See application file for complete search history.

(56) References Cited

U.S. PATENT DOCUMENTS

| | | | | |
|---|---|---|---|---|
| 6,254,996 | B1 * | 7/2001 | Fukuda et al. | 428/480 |
| 2003/0008247 | A1 * | 1/2003 | Lelental et al. | 430/517 |

FOREIGN PATENT DOCUMENTS

| | | |
|---|---|---|
| JP | A-63-269415 | 11/1988 |
| JP | A-02-123623 | 5/1990 |
| JP | A-8-78164 | 3/1996 |
| JP | A-11-273874 | 10/1999 |
| JP | A-2000-052522 | 2/2000 |
| JP | A-2003-192994 | 7/2003 |
| JP | A-2003-246874 | 9/2003 |
| JP | A-2004-185914 | 7/2004 |
| JP | A-2004-269702 | 9/2004 |
| KR | 2003-0014349 A | 2/2003 |
| WO | WO 01/54467 A1 | 7/2001 |

OTHER PUBLICATIONS

English translation of JP2004-269702, Sep. 2004.*

* cited by examiner

*Primary Examiner*—Ramsey Zacharia
(74) *Attorney, Agent, or Firm*—Oliff & Berridge, PLC

(57) ABSTRACT

The present invention provides a transparent conductor comprising a substrate, and a conductive layer containing conductive particles and a conductive polymer.

11 Claims, 2 Drawing Sheets

TRANSPARENT CONDUCTOR

BACKGROUND OF THE INVENTION

1. Field of the Invention

The present invention relates to a transparent conductor.

2. Related Background Art

Transparent electrodes are used in LCD's, PDP's, organic EL panels, touch panels and so on, and transparent conductors are used as such transparent electrodes. Such a transparent conductor is formed from a substrate and a conductive layer, and among such transparent conductors there are ones in which a sputtered film (conductive layer) is deposited on the substrate, and ones in which a conductive layer comprising conductive particles and a binder is formed on the substrate. However, if such a transparent conductor is used under a high-humidity environment or in an atmosphere of a chemical substance such as an organic solvent or an organic gas (hereinafter sometimes referred to as "under a high-humidity environment or the like"), then moisture or the chemical substance will be gradually absorbed, and hence the electrical resistance of the transparent conductor will increase, and furthermore the change over time in this electrical resistance will tend to become greater.

If such a transparent conductor is used, for example, in a touch panel or the like and placed under such an environment, then there will thus be a risk of the operation of the touch panel or the like gradually becoming unstable.

A transparent conductor according to which increase in or change over time in the electrical resistance is suppressed is thus desired. For example, there has been proposed a light-transmitting conductive material using a phenoxy resin or a mixed resin of a phenoxy resin and an epoxy resin made to have low hygroscopicity, or polyvinylidene fluoride, as a resin for fixing conductive particles in place (see, for example, Japanese Patent Application Laid-open No. 08-78164, Japanese Patent Application Laid-open No. 11-273874).

SUMMARY OF THE INVENTION

However, for a transparent conductor using a resin made to have low hygroscopicity as described in Japanese Patent Application Laid-open No. 08-78164 or Japanese Patent Application Laid-open No. 11-273874, there are again cases in which the electrical resistance increases upon prolonged use particularly under a high-humidity environment or the like.

In view of the above state of affairs, it is an object of the present invention to provide a transparent conductor according to which increase in or change over time in the electrical resistance of the transparent conductor can be adequately suppressed even under a high-humidity environment or the like.

The present inventors carried out assiduous studies to attain the above object, thinking that increase in or change over time in the electrical resistance of the transparent conductor is perhaps due to connections between conductive particles being broken. The present inventors thus thought that if the conductive layer is made to contain something able to electrically compensate then it should be possible to suppress increase in or change over time in the electrical resistance of the transparent conductor even in the case that connections between conductive particles are broken. The present inventors then carried out further assiduous studies based on this conjecture, and as a result discovered that the above object can be attained through inventions as follows, thus accomplishing the present invention.

That is, the present invention provides a transparent conductor comprising a substrate, and a conductive layer containing conductive particles and a conductive polymer, the conductive layer being provided on one surface of the substrate. Note that in the present invention, "conductive polymer" means a polymer that is conductive due to pi bonding. Here, the transparent conductor of the present invention may be film-like or plate-like, film-like meaning that the transparent conductor has a thickness in a range of 50 nm to 1 mm, and plate-like meaning that the transparent conductor has a thickness exceeding 1 mm.

According to this transparent conductor, because the conductive layer is made to contain the conductive polymer, the conductive polymer present around the conductive particles can be made to contact the conductive particles, and hence can electrically compensate in the transparent conductor. That is, for the above transparent conductor, even if the conductive layer swells due to diffusion of moisture or a chemical substance such as a solvent or an organic gas into the conductive layer so that connections between conductive particles are broken, electricity can still be conducted through the conductive polymer. According to the transparent conductor of the present invention, increase in or change over time in the electrical resistance of the transparent conductor can thus be adequately suppressed even under a high-humidity environment or the like.

Moreover, due to the above, even in the case that cracks arise in the conductive layer of the transparent conductor, increase in or change over time in the electrical resistance of the transparent conductor can be adequately suppressed.

Furthermore, for the transparent conductor of the present invention, compared with a conventional transparent conductor in which an insulating binder is used, the conductive polymer which has excellent conductivity is present between the conductive particles. Accordingly, for the transparent conductor, the conductive polymer electrically compensates, and hence the initial electrical resistance of the transparent conductor can be reduced.

For the above transparent conductor, preferably, the conductive polymer contains at least one compound selected from the group comprising polyacetylenes, polypyrroles, polythiophenes, polyphenylenevinylenes, polyphenylenes, polysilanes, polyfluorenes, and polyanilines.

If the conductive polymer contained in the conductive layer of the transparent conductor is such a compound, then the electrical compensation in the transparent conductor can be achieved more reliably. In this case, increase in or change over time in the electrical resistance of the transparent conductor can thus be suppressed yet more thoroughly even under a high-humidity environment or the like. Moreover, such a conductive polymer has poor chemical reactivity with a binder, and hence the durability of the conductive layer can be improved.

For the above transparent conductor, preferably, the conductive polymer contains a polythiophene. In this case, a conductive layer having excellent optical transmissivity and conductivity can be formed.

For the above transparent conductor, preferably, the conductive polymer is colloidal. In the case of using a polythiophene as the conductive polymer, in the transparent conductor, the polythiophene is present in the form of a colloid, and contacts the conductive particles, whereby each conductive particle can be made to contact a plurality of other conductive particles. The electrical compensation in the transparent conductor can thus be achieved yet more reliably.

Moreover, for the above transparent conductor, because each conductive particle forms many conducting pathways, even in the case that cracking, deformation or the like arises in the conductive layer and hence the conducting pathway is lost between a pair of conductive particles, a conducting pathway between other conductive particles can be secured. According to the transparent conductor of the present invention, increase in the electrical resistance of the transparent conductor can thus be suppressed yet better. Moreover, because a large number of conducting pathways are formed, there is also an effect of reducing the electrical resistance of the transparent conductor.

For the above transparent conductor, preferably, the polythiophene is a compound represented by undermentioned general formula (1).

(1)

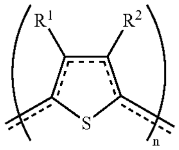

In formula (1), $R^1$ and $R^2$ each independently represents a hydrogen atom, an optionally substituted hydrocarbon group having 1 to 10 carbon atoms, or an optionally substituted aryl group, or $R^1$ and $R^2$ together represent carbon atoms or hetero atoms constituting a 4- to 20-membered ring. The above hydrocarbon group may be chain or cyclic. Moreover, the above ring may contain hetero atoms in addition to $R^1$ and $R^2$, and the ring may be an aromatic ring. n represents a positive integer.

If the polythiophene is a compound represented by general formula (1), then a transparent conductor having excellent transparency can be obtained, and the resistivity of the transparent conductor can also be further reduced.

According to the present invention, there can be provided a transparent conductor according to which increase in or change over time in the electrical resistance of the transparent conductor can be adequately suppressed even under a high-humidity environment.

DESCRIPTION OF THE PREFERRED EMBODIMENTS

Figure 1:
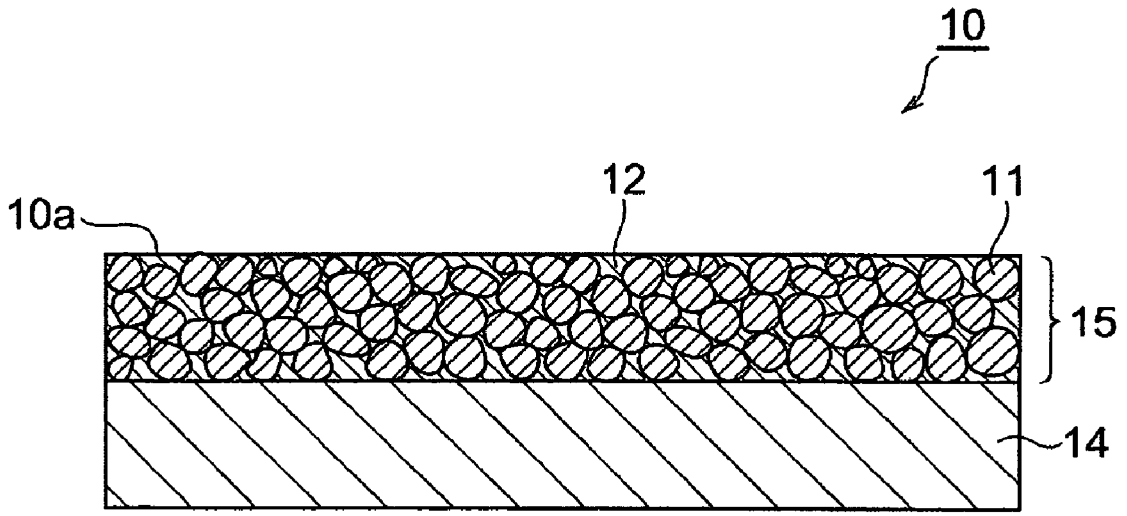
FIG. 1 is a schematic sectional view showing a first embodiment of a transparent conductor according to the present invention.

Following is a detailed description of preferred embodiments of the present invention, with reference to the drawings as required. Note that in the drawings, elements that are the same as one another are designated by the same reference numeral, and redundant repeated description will be omitted. Moreover, dimensional ratios are not limited to being the ratios shown in the drawings.

First Embodiment

First, a first embodiment of the transparent conductor of the present invention will be described.

FIG. 1 is a schematic sectional view showing the first embodiment of the transparent conductor of the present invention. As shown in FIG. 1, the transparent conductor 10 of the present embodiment comprises a substrate 14 and a conductive layer 15 laminated together. The conductive layer 15 has conductive particles 11 and a conductive polymer 12 therein, the conductive particles 11 being packed into the conductive layer 15, and being in contact with the conductive polymer 12.

In the transparent conductor 10, the conductive particles 11 preferably contact one another, and moreover some of the conductive particles 11 are exposed at a surface 10*a* of the conductive layer 15 of the transparent conductor 10 on the opposite side to the substrate 14. The transparent conductor 10 thus exhibits conductivity.

Here, a description will be given of the conductive layer 15 and the substrate 14 of the transparent conductor 10.

<Conductive layer> The conductive layer 15 contains the conductive particles 11 and the conductive polymer 12. Here, a description will be given of the conductive particles 11 and the conductive polymer 12.

(Conductive particles) The conductive particles 11 are constituted from a transparent conductive oxide material. There are no particular limitations on the transparent conductive oxide material so long as this material is both transparent and conductive; examples of such a transparent conductive oxide material include indium oxide, or indium oxide doped with at least one element selected from the group comprising tin, zinc, tellurium, silver, gallium, zirconium, hafnium and magnesium, tin oxide, or tin oxide doped with at least one element selected from the group comprising antimony, zinc and fluorine, and zinc oxide, or zinc oxide doped with at least one element selected from the group comprising aluminum, gallium, indium, boron, fluorine and manganese.

The mean particle diameter of the conductive particles 11 is preferably in a range of 10 nm to 80 nm. If the mean particle diameter is less than 10 nm, then compared with the case that the mean particle diameter is at least 10 nm, the conductivity of the transparent conductor 10 will tend to be prone to fluctuating. That is, for the transparent conductor 10 according to the present embodiment, conductivity arises through oxygen defects that occur in the conductive particles 11, but if the mean particle diameter of the conductive particles 11 is less than 10 nm, then compared with the case that the mean particle diameter is in the above range, in the case for example that the external oxygen concentration is high the number of oxygen defects may drop, and hence the conductivity may fluctuate. On the other hand, if the mean particle diameter exceeds 80 nm, then compared with the case that the mean particle diameter is in the above range, in for example the wavelength region of visible light, there will be more scattering of light than in the case that the mean particle diameter is not more than 80 nm, and hence the transmissivity of the transparent conductor 10 in the wavelength region of visible light will tend to drop, and the haze value will tend to increase.

Furthermore, the packing fraction of the conductive particles 11 in the conductive layer 15 is preferably in a range of 10 vol % to 70 vol % If the packing fraction is less than 10 vol %, then compared with the case that the packing fraction is in the above range, the electrical resistance of the transparent conductor 10 will tend to increase, whereas if the packing fraction exceeds 70 vol %, then compared with the case that packing fraction is in the above range, the mechanical strength of the film forming the conductive layer 15 will tend to drop.

In this way, if the mean particle diameter and the packing fraction of the conductive particles 11 are in the above ranges, then the transparency of the transparent conductor 10 can be improved, and moreover the initial electrical resistance can be reduced.

Moreover, the specific surface area of the conductive particles 11 is preferably in a range of 10 $m^2/g$ to 50 $m^2/g$. If the specific surface area is less than 10 $m^2/g$, then compared with the case that the specific surface area is in the above range, there will tend to be more scattering of visible light, whereas if the specific surface area exceeds 50 $m^2/g$, then compared with the case that the specific surface area is in the above range, the stability of the transparent conductor 10 will tend to drop. Note that the specific surface area referred to here is the value as measured using a specific surface area measuring apparatus (model: NOVA 2000, made by Quantachrome) after the sample has been vacuum-dried for 30 minutes at 300° C.

(Conductive polymer) The conductive polymer 12 preferably contains at least one compound selected from the group comprising polyacetylenes, polypyrroles, polythiophenes, polyphenylenevinylenes, polyphenylenes, polysilanes, polyfluorenes, and polyanilines.

If the conductive polymer is such a compound, then electrical compensation can be achieved more reliably. In this case, increase in or change over time in the electrical resistance of the transparent conductor can thus be suppressed yet more thoroughly even under a high-humidity environment or the like. Moreover, such a conductive polymer has poor chemical reactivity with a binder, and hence the durability of the conductive layer can be improved.

Of the above, the conductive polymer particularly preferably contains a polythiophene. In this case, a conductive layer having excellent optical transmissivity and conductivity can be formed.

In the transparent conductor, the conductive particles are preferably agglomerated together. In the case of using a polythiophene as the conductive polymer, in the transparent conductor, the conductive particles can agglomerate together, with each conductive particle being in contact with a plurality of other surrounding conductive particles, and hence the electrical compensation in the transparent conductor can be achieved yet more reliably. That is, for the transparent conductor, even in the case that cracks or the like arise in the conductive layer and hence contact is lost between a pair of conductive particles, electricity can be conducted through other conductive particles. According to the transparent conductor of the present invention, increase in the electrical resistance of the transparent conductor can thus be suppressed yet better.

Furthermore, through the conductive particles agglomerating together, the distance between adjacent conductive particles is reduced, and hence when light passes through the transparent conductor, even in the case that the light is scattered by one of the conductive particles, the width of the scattering of the light can be reduced by the adjacent conductive particles. The haze value can thus be reduced, and hence the transparency of the transparent conductor is improved.

Of the above polythiophenes, it is particularly preferable for a compound represented by undermentioned general formula (1) to be contained.

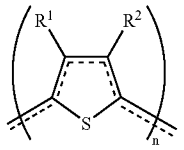

(1)

In formula (1), $R^1$ and $R^2$ each independently represents a hydrogen atom, an optionally substituted hydrocarbon group having 1 to 10 carbon atoms, or an optionally substituted aryl group, or $R^1$ and $R^2$ together represent carbon atoms or hetero atoms constituting a 4- to 20-membered ring. The above hydrocarbon group may be chain or cyclic. Moreover, the above ring may contain hetero atoms in addition to $R^1$ and $R^2$, and the ring may be an aromatic ring. n represents a positive integer.

If the polythiophene is a compound represented by general formula (1), then a transparent conductor having excellent transparency can be obtained, and the resistivity of the transparent conductor can also be further reduced.

Here, n in formula (1) is preferably in a range of 50 to 1000. If n is less than 50, then compared with the case that n is in the above range, the shape retentivity will tend to be poor, whereas if n exceeds 1000, then compared with the case that n is in the above range, the size of the colloidal particles will tend to become too large, and hence the optical transmissivity will tend to drop. Moreover, there are no particular limitations on substituents for the optionally substituted hydrocarbon group having 1 to 10 carbon atoms, but examples are the groups represented by undermentioned chemical formulae (2a) and (2b).

$$—COO^- \qquad (2a)$$

$$—SO_3^- \qquad (2b)$$

Furthermore, there are no particular limitations on substituents for the optionally substituted aryl group, but examples include chain hydrocarbon groups having 4 to 22 carbon atoms. Examples of the aryl group include a phenyl group, a tolyl group, a xylyl group, a biphenyl group, a naphthyl group, an anthryl group, and a phenanthryl group.

Of the above, the polythiophene is yet more preferably a compound represented by one of undermentioned general formulae (3) to (5).

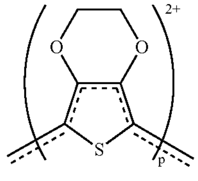

(3)

-continued (4)

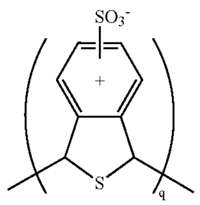

(5)

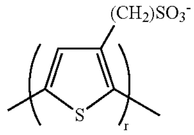

In formulae (3) to (5), p, q and r each independently represents a positive integer.

Here, p in formula (3) is preferably in a range of 50 to 1000. If p is less than 50, then compared with the case that p is in the above range, the shape retentivity will tend to be poor, whereas if p exceeds 1000, then compared with the case that p is in the above range, the colloid shape will tend to become too large, and hence the optical transmissivity will tend to drop. Moreover, q in formula (4) is preferably in a range of 50 to 1000. If q is less than 50, then compared with the case that q is in the above range, the shape retentivity will tend to be poor, whereas if q exceeds 1000, then compared with the case that q is in the above range, the colloid shape will tend to become too large, and hence the optical transmissivity will tend to drop. Moreover, r in formula (5) is preferably in a range of 50 to 1000. If r is less than 50, then compared with the case that r is in the above range, the shape retentivity will tend to be poor, whereas if r exceeds 1000, then compared with the case that r is in the above range, the colloid shape will tend to become too large, and hence the optical transmissivity will tend to drop.

If the polythiophene is a compound represented by one of general formulae (3) to (5), then a transparent conductor having yet better transparency can be obtained, and the resistivity of the transparent conductor can also be further reduced.

Of the above, a conductive polymer represented by general formula (3) is yet more preferable. The conductive polymer represented by general formula (3) is a polycation, and there are no particular limitations on the anion acting as the counter ion. Of such anions, a polyanion represented by undermentioned general formula (6) (polystyrenesulfonate) can be preferably used.

(6)

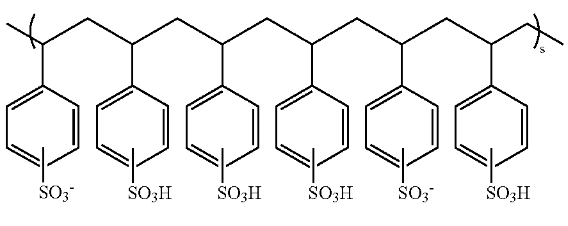

In formula (6), s represents a positive integer.

In this case, a transparent conductor having yet better transparency can be obtained, and the resistivity of the transparent conductor can also be yet further reduced.

Here, s in formula (6) is preferably in a range of 10 to 100. If s is less than 10, then compared with the case that s is in the above range, the shape retentivity will tend to be poor, whereas if s exceeds 100, then compared with the case that s is in the above range, the colloid shape will tend to become too large, and hence the optical transmissivity will tend to drop.

The amount of the conductive polymer 12 used in the present embodiment is preferably in a range of 2 to 10 parts by mass per 100 parts by mass in total of the conductive particles and the conductive polymer. If this amount is less than 2 parts by mass, then compared with the case that this amount is in the above range, the electrical resistance of the conductive layer will tend to increase, whereas if this amount exceeds 10 parts by mass, then compared with the case that this amount is in the above range, the optical transmissivity will tend to drop.

Moreover, the colloid shape of the conductive polymer is preferably such that the diameter of the colloid particles is in a range of 5 nm to 50 nm. If the size of the colloid particles is less than 5 nm, then compared with the case that the size of the colloid particles is in the above range, the mechanical strength of the conductive layer will tend to drop, whereas if the size of the colloid particles exceeds 50 nm, then compared with the case that the size of the colloid particles is in the above range, the optical transmissivity will tend to drop.

The thickness of the conductive layer 15 is preferably in a range of 50 nm to 5 μm. If the thickness is less than 50 nm, then compared with the case that the thickness is in the above range, the wear resistance will tend to drop, whereas if the thickness exceeds 5 μm, then compared with the case that the thickness is in the above range, glare or the like will tend to arise due to the influence of the surface roughness and the refractive index of the conductive layer 15 and so on, and hence the visibility will tend to drop.

Due to the transparent conductor 10 according to the present embodiment having therein the conductive layer 15 containing the conductive particles 11 and the conductive polymer 12 in this way, the conductive polymer 12 present around the conductive particles 11 can be made to contact the conductive particles 11, and hence can electrically compensate in the transparent conductor 10. Accordingly, for the transparent conductor 10, even if the conductive layer 15 swells due to diffusion of moisture or a chemical substance such as a solvent or an organic gas into the conductive layer 15 so that connections between conductive particles 11 are broken, electricity can still be conducted through the conductive polymer 12. According to the transparent conductor 10 of the present invention, increase in or change over time in the electrical resistance of the transparent conductor can thus be adequately suppressed even under a high-humidity environment or the like.

Moreover, due to the above, even in the case that cracks arise in the conductive layer 15 of the transparent conductor 10, increase in or change over time in the electrical resistance can be adequately suppressed.

Furthermore, for the transparent conductor 10, compared with a conventional transparent conductor in which an insulating binder 13*a* is used, the conductive polymer 12 which has excellent conductivity is present between the conductive particles 11. Accordingly, for the transparent conductor 10, the conductive polymer 12 electrically compensates, and hence the initial electrical resistance of the transparent conductor 10 can be reduced.

(Optional components) The conductive layer 15 of the transparent conductor 10 according to the present embodiment may be made to contain at least one binder. Through the conductive layer 15 containing a binder, the mechanical strength of the conductive layer 15 can be improved.

Examples of such a binder include acrylic resins and epoxy resins.

Of these, it is preferable to use an acrylic resin as a binder. In this case, compared with the case that another binder is used, the refractive index of the conductive layer can be reduced. That is, for a transparent conductor containing a conductive layer containing an acrylic resin, the transparency can be improved. Moreover, such an acrylic resin is also excellent in terms of chemical resistance to acids and alkalis, and also scratch resistance (surface hardness). A transparent conductor containing a conductive layer containing an acrylic resin will thus be yet more suitable for use in a touch panel or the like that it is envisaged will be wiped with cleaning agents containing organic solvents, surfactants and so on, or will be subjected to contact or rubbing between mutually facing conductive surfaces.

In the case that the conductive layer 15 contains a binder as above, the conductive layer 15 is preferably made to further contain a crosslinking agent. By including a crosslinking agent in the conductive layer 15, the binder can be crosslinked together, and hence the conductive layer 15 can be made to have a denser structure. Accordingly, in this case, infiltration of moisture from the outside into the conductive layer can be prevented.

Furthermore, the conductive layer may be made to contain a surface treatment agent such as a silane coupling agent, a silazane compound, a titanate coupling agent, an aluminate coupling agent, or a phosphonate coupling agent. Of these, a silane coupling agent or a silazane compound is preferable.

For a transparent conductor containing a conductive layer containing such a surface treatment agent, the surface treatment agent can bond to hydroxyl groups on the surfaces of the conductive particles so as to make the surfaces of the conductive particles hydrophobic, and hence swelling of the transparent conductor through absorption of moisture can be suppressed. In this case, increase in the electrical resistance of the transparent conductor can thus be adequately suppressed even in the case that the transparent conductor is used for a long time under a high-humidity environment or the like. One of the above surface treatment agents may be used alone, or a plurality may be used mixed together.

Moreover, as a crosslinking agent, one having a plurality of vinyl groups in the molecule thereof is preferable. With such a crosslinking agent, the vinyl groups of the crosslinking agent form bonds, and hence a number of crosslinked sites corresponding to the number of vinyl groups can be formed. From such a viewpoint, the greater the number of vinyl groups the better, specifically 2 to 100 is preferable. Note that if the number of vinyl groups exceeds 100, then compared with the case that the number of vinyl groups is in the above range, the crosslink density will tend to drop due to suppression of free movement.

The conductive layer may further contain additives as required. Examples of additives include, in addition to surface treatment agents and crosslinking agents as described above, photopolymerization initiators, fire retardants, UV absorbers, colorants, and plasticizers.

<Substrate> Next, a description will be given of the substrate. There are no particular limitations on the substrate 14 so long as the substrate 14 is constituted from a material that is transparent to the high energy radiation mentioned below and visible light. That is, the substrate 14 may be a publicly known transparent film, with examples including a film of a polyester such as polyethylene terephthalate (PET), a film of a polyolefin such as polyethylene or polypropylene, a polycarbonate film, an acrylic film, or a norbornene film (e.g. Arton made by JSR). Other than a resin film, glass can also be used as the substrate 14. The substrate 14 preferably comprises a resin only. In this case, the transparency and flexibility of the transparent conductor 10 are better than in the case that the substrate 14 contains both a resin and a material other than a resin. This is particularly effective in the case that the transparent conductor 10 is used in a touch panel or the like.

<Manufacturing method> Next, a description will be given of a method of manufacturing the transparent conductor 10 according to the present embodiment for the case that indium oxide doped with tin (hereinafter referred to as "ITO") is used for the conductive particles 11.

First, the conductive particles 11 and the conductive polymer 12 are placed on a baseplate, not shown, to form a conductive layer containing the conductive particles 11 and the conductive polymer 12. Here, a description will be given of the conductive particles 11.

First, indium chloride and tin chloride are subjected to neutralization treatment using an alkali so as to bring about coprecipitation (precipitation step). Salt by-produced at this time is removed by decantation or centrifugal separation. The coprecipitate obtained is dried, and then the dried matter obtained is subjected to baking in an atmosphere and pulverization. The conductive particles 11 are thus manufactured. From the viewpoint of controlling oxygen defects, the above baking is preferably carried out in a nitrogen atmosphere, or an atmosphere of a noble gas such as helium, argon or xenon.

The conductive particles 11 thus obtained are mixed with the conductive polymer 12 to obtain a mixed liquid. Note that in the case that this mixed liquid has a high viscosity so that processing will be difficult, or in the case the conductive polymer 12 is solid, the mixed liquid is obtained by dispersing the conductive particles 11 and the conductive polymer 12 in a liquid. Examples of the liquid for dispersing the conductive particles 11 and the conductive polymer 12 include saturated hydrocarbons such as hexane, aromatic hydrocarbons such as toluene and xylene, alcohols such as methanol, ethanol, propanol and butanol, ketones such as acetone, methyl ethyl ketone, isobutyl methyl ketone and diisobutyl ketone, esters such as ethyl acetate and butyl acetate, ethers such as tetrahydrofuran, dioxane and diethyl ether, and amides such as N,N-dimethylacetamide, N,N-dimethylformamide and N-methylpyrrolidone. Here, the conductive polymer 12 may be used dissolved in the liquid. Moreover, the mixed liquid may be made to contain optional components such as an acrylic resin (binder) as described earlier.

The mixed liquid thus obtained is coated onto the baseplate so as to form the conductive layer 15. As the baseplate, for example glass can be used, or else a film of a polyester, polyethylene, polypropylene or the like, or any of various plastic baseplates can be used. In the case of using a liquid as above, a drying step is preferably carried out after the coating on. Examples of possible coating methods include a reverse rolling method, a direct rolling method, a blade method, a knife method, an extrusion method, a nozzle method, a curtain method, a gravure rolling method, a bar coating method, a dipping method, a kiss coating method, a spin coating method, a squeezing method, and spraying.

Next, the substrate 14 is stuck onto the conductive layer 15. An anchor layer may be provided in advance on the surface of the substrate 14 to which the conductive layer 15 is to be adhered. If an anchor layer is provided on the substrate 14 in advance, then the conductive layer 15 can be fixed to the substrate 14 more firmly via the anchor layer. A polyurethane or the like can be suitably used as the anchor layer.

Next, the mixed liquid constituting the conductive layer 15 is cured by heating. Moreover, in the case that the conductive layer 15 contains a photo-curable binder, the conductive layer 15 is cured by being irradiated with high energy radiation from above the substrate 14. The high energy radiation may be, for example, UV radiation, or else an electron beam, γ-rays, X-rays or the like.

The structure comprising the conductive layer 15 and the substrate 14 is then peeled away from the baseplate, whereby a transparent conductor 10 as shown in FIG. 1 in which the conductive layer 15 is formed on one surface of the substrate 14 is obtained.

The transparent conductor 10 can be used in a touch panel, or another panel switch such as a light-transmitting switch, and furthermore instead of a panel switch, can also be suitably used in a noise-counteracting component, a heating element, an EL electrode, a backlight electrode, an LCD, a PDP, or the like.

Second Embodiment

Next, a second embodiment of the transparent conductor of the present invention will be described. Note that component elements the same as or similar to ones in the first embodiment are designated by the same reference numeral as in the first embodiment, and redundant repeated description will be omitted.

Figure 2:
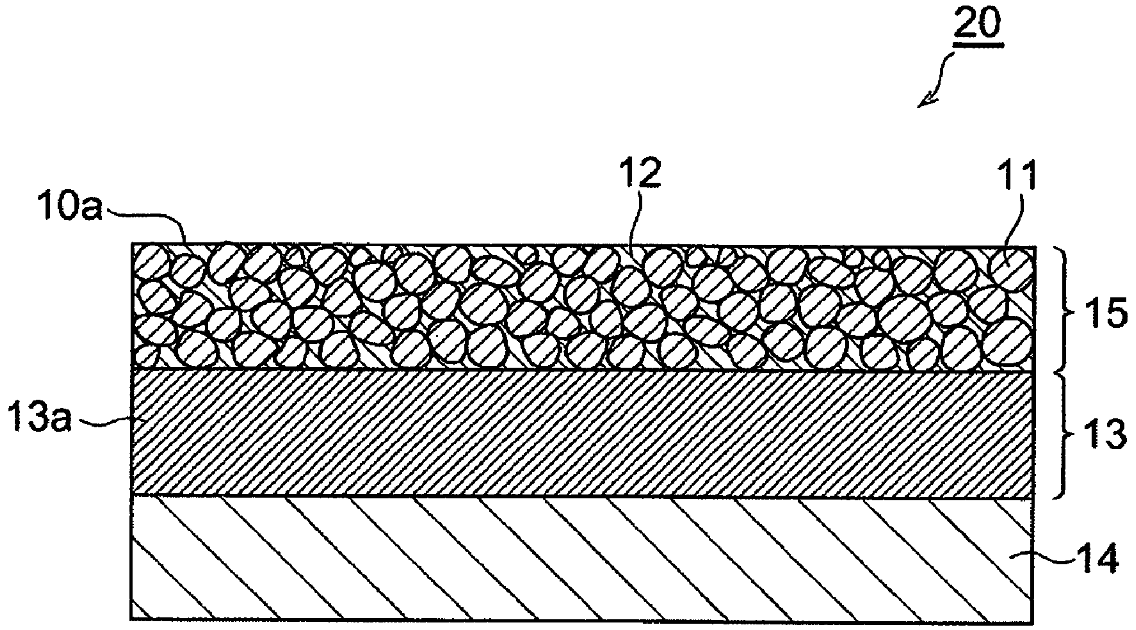
FIG. 2 is a schematic sectional view showing a second embodiment of the transparent conductor according to the present invention.

FIG. 2 is a schematic sectional view showing the second embodiment of the transparent conductor of the present invention. As shown in FIG. 2, the transparent conductor 20 of the present embodiment differs from the transparent conductor 10 of the first embodiment described above in that a binder layer 13 is provided between the substrate 14 and the conductive layer 15.

For the transparent conductor 20 of the present embodiment, because the binder layer 13 is laminated between the substrate 14 and the conductive layer 15, upon prolonged use of the transparent conductor 20, even if the substrate 14 is bent, the binder layer 13 will fulfill a function of cushioning the force of the bending, and hence bending of the conductive layer 15 along with the substrate 14 can be suppressed. For the transparent conductor 20, cracking of the conductive layer 15 can thus be adequately suppressed even upon prolonged use of the transparent conductor 20.

<Binder layer> Next, a description will be given of the binder layer 13.

The binder layer 13 is constituted from at least one binder 13*a*. There are no particular limitations on the binder 13*a*; specifically, an acrylic resin, an epoxy resin, or the like can be used. Other than these, the cured material of a photo-curable compound, a thermosetting compound, or the like can be used. Such a photo-curable compound may be any organic compound that is cured by light, and such a thermosetting compound may be any organic compound that is cured by heat. Here, such organic compounds include substances that will act as a raw material of the binder 13*a*, specifically a monomer, dimer, trimer, oligomer, or the like able to form the binder 13*a*.

Of the above, it is preferable to use an acrylic resin as the binder 13*a*. In this case, compared with the case of using another binder 13*a*, the refractive index of the binder layer 13 can be reduced. That is, for a transparent conductor 20 containing a binder layer 13 containing an acrylic resin, not only is the cushioning function described above fulfilled, but moreover the transparency is also excellent. Moreover, such an acrylic resin is also excellent in terms of chemical resistance to acids and alkalis, and also scratch resistance (surface hardness). A transparent conductor 20 containing a binder layer 13 containing an acrylic resin will thus be yet more suitable for use in a touch panel or the like that it is envisaged will be wiped with cleaning agents containing organic solvents, surfactants and so on, or will be subjected to contact or rubbing between mutually facing conductive surfaces.

Moreover, the binder 13*a* is preferably one constituted from a photo-curable compound. In this case, there are the advantages that the curing reaction can be controlled, and moreover the time required for the curing is short, and hence process control becomes easier.

As such a photo-curable compound, a monomer or the like containing a vinyl group, an epoxy group, or a derivative thereof can be preferably used. One of these may be used alone, or a mixture of a plurality thereof may be used.

For the binder layer 13 to fulfill the cushioning function described above, it is preferable for the binder 13*a* constituting the binder layer 13 to be soft, but for a transparent conductor in which the binder 13*a* is soft, maintaining the form of the binder layer 13 for a long period tends to be difficult. In this case, it is preferable to further include a filler in the binder layer 13. As a result, even in the case that a soft binder 13*a* is used in the binder layer 13, the form of the binder layer 13 can be maintained.

There are no particular limitations on the filler; for example, an organic filler such as an aramid, polystyrene beads or acrylic beads, or an inorganic filler such as silica, glass, alumina, zirconia, titania, ITO, tin oxide or zinc oxide can be used.

Of the above, it is preferable to use an inorganic filler such as silica, glass, ITO, tin oxide or zinc oxide. The advantage of using such an inorganic filler is that excellent transparency will then be obtained for the transparent conductor of the present embodiment.

Moreover, of the above inorganic fillers, it is particularly preferable to use ITO, tin oxide or zinc oxide. In this case, the inorganic filler itself exhibits conductivity, and hence electrical compensation for the transparent conductor obtained can be achieved yet more reliably. That is, even in the case that cracks or the like arise in the conductive layer and hence contact is lost between conductive particles, electricity can be conducted through the inorganic filler. Increase in the electrical resistance of the transparent conductor can thus be suppressed. Moreover, the conductive inorganic filler may be doped with one or a plurality of elements with the objective of improving the conductivity.

Moreover, the binder layer 13 may is preferably made to further contain a crosslinking agent. By including a crosslinking agent in the binder layer, the binder 13*a* can be crosslinked together in the transparent conductor, and hence the binder layer can be made to have a denser structure. Accordingly, in this case, infiltration of moisture from the outside into the binder layer can be prevented.

The binder layer 13 may further contain additives as required. Examples of additives include, in addition to fillers and crosslinking agents as described above, photopolymerization initiators, fire retardants, UV absorbers, colorants, and plasticizers.

For the transparent conductor 20 according to the present embodiment, the packing fraction of the conductive particles 11 is preferably in a range of 10 vol % to 70 vol %. If the packing fraction is less than 10 vol %, then compared with the case that the packing fraction is in the above range, the electrical resistance of the transparent conductor 20 will tend to increase, whereas if the packing fraction exceeds 70 vol %, then compared with the case that packing fraction is in the above range, the mechanical strength of the film forming the conductive layer 15 will tend to drop.

Moreover, the thickness of the conductive layer 15 is preferably in a range of 50 nm to 5 μm. If the thickness is less than 50 nm, then compared with the case that the thickness is in the above range, the wear resistance will tend to drop, whereas if the thickness exceeds 5 μm, then compared with the case that the thickness is in the above range, glare or the like will tend to arise due to the influence of the surface roughness and the refractive index of the conductive layer 15 and so on, and hence the visibility will tend to drop.

Furthermore, the thickness of the binder layer 13 is preferably in a range of 500 nm to 10 μm. If the thickness is less than 500 mm, then compared with the case that the thickness is in the above range, the wear resistance will tend to drop, whereas if the thickness exceeds 10 μm, then compared with the case that the thickness is in the above range, the optical transmissivity of the conductive layer 15 will tend to drop.

<Manufacturing method> Next, a description will be given of a method of manufacturing the transparent conductor 20 according to the present embodiment.

First, a mixture of the conductive particles 11 and the conductive polymer 12 is placed on a baseplate, not shown. Here, it is preferable to provide an anchor layer on the baseplate in advance for fixing the conductive particles 11 onto the baseplate. If an anchor layer is provided on the baseplate in advance, then the conductive particles 11 can be fixed onto the baseplate securely, and moreover the placing of the conductive particles 11 on the baseplate can be carried out easily. A polyurethane or the like can be suitably used as the anchor layer.

Moreover, to fix the conductive particles 11 onto the baseplate, the conductive particles 11 may be compressed toward the baseplate so as to form a compressed layer. This is useful since in this case the conductive particles 11 can be adhered to the baseplate without forming an anchor layer. The compression can be carried out using a sheet press, a roll press, or the like. Note that even in this case, it is preferable to provide an anchor layer on the baseplate in advance. In this case, the conductive particles 11 can be fixed onto the baseplate more securely. As the baseplate, for example glass can be used, or else a film of a polyester, polyethylene, polypropylene or the like, or any of various plastic baseplates can be used.

After the compressed layer (conductive layer 15) has been formed in this way, the binder layer 13 is formed. As the binder 13*a*, one that can be cured by high energy radiation as described below is used. Note that in the case that the binder 13*a* has a high viscosity so that processing will be difficult, or in the case the binder 13*a* is solid, the binder 13*a* is dispersed in a liquid to form a dispersion. Examples of the liquid for dispersing the binder 13*a* include saturated hydrocarbons such as hexane, aromatic hydrocarbons such as toluene and xylene, alcohols such as methanol, ethanol, propanol and butanol, ketones such as acetone, methyl ethyl ketone, isobutyl methyl ketone and diisobutyl ketone, esters such as ethyl acetate and butyl acetate, ethers such as tetrahydrofuran, dioxane and diethyl ether, and amides such as N,N-dimethylacetamide, N,N-dimethylformamide and N-methylpyrrolidone. Here, the binder 13*a* may be used dissolved in the liquid. Moreover, a filler and a crosslinking agent may be added to the binder 13*a*.

The binder 13*a* or the dispersion of the binder 13*a* is coated onto the surface of the compressed layer. As a result, some of the binder 13*a* penetrates into the compressed layer. In the case of using a liquid as above, a drying step is preferably carried out after the coating on. Examples of possible coating methods include a reverse rolling method, a direct rolling method, a blade method, a knife method, an extrusion method, a nozzle method, a curtain method, a gravure rolling method, a bar coating method, a dipping method, a kiss coating method, a spin coating method, a squeezing method, and spraying.

Next, the substrate 14 is stuck onto the binder layer 13. An anchor layer may be provided in advance on the surface of the substrate 14 to which the binder layer 13 is to be adhered. If an anchor layer is provided on the substrate 14 in advance, then the binder layer 13 can be fixed to the substrate 14 more firmly via the anchor layer. A polyurethane or the like can be suitably used as the anchor layer.

Next, the binder layer 13, and the some of the binder 13*a* that has penetrated into the compressed layer, are cured by being irradiated with high energy radiation from above the substrate 14 having the binder layer provided thereon. Note that in the case that a thermosetting resin is used as the binder 13*a* (including the some of which that has penetrated into the compressed layer), the curing is carried out by heating. The high energy radiation may be, for example, UV radiation, or else an electron beam, γ-rays, X-rays or the like.

The structure comprising the conductive layer 15, the binder layer 13 and the substrate 14 is then peeled away from the baseplate, whereby a transparent conductor 20 as shown in FIG. 2 in which the compressed layer (conductive layer 15) and the binder layer 13 are formed on one surface of the substrate 14 is obtained.

The transparent conductor 20 can be used in a touch panel, or another panel switch such as a light-transmitting switch, and furthermore instead of a panel switch, can also be suitably used in a noise-counteracting component, a heating element, an EL electrode, a backlight electrode, an LCD, a PDP, or the like.

EXAMPLES

Following is a more detailed description of the present invention through examples. However, the present invention is not limited to these examples.

(Manufacture of conductive particles) An aqueous solution of 19.9 g of indium chloride tetrahydrate (made by Kanto Chemical Co, Inc.) and 2.6 g of stannic chloride (made by Kanto Chemical Co, Inc.) in 980 g of water, and ammonia water (made by Kanto Chemical Co, Inc) that had been diluted with water by a factor of 10 were mixed together, thus producing a white precipitate (coprecipitate).

The liquid containing the produced precipitate was subjected to solid-liquid separation using a centrifugal separator so as to obtain the solid matter. This solid matter was further put into 1000 g of water, dispersion was carried out using a homogenizer, and solid-liquid separation was again carried out using a centrifugal separator. The dispersion and solid-liquid separation were repeated 5 times, and then the solid matter was dried, and then heated for 1 hour at 600° C. in a nitrogen atmosphere, thus obtaining an ITO powder (conductive particles). An aqueous mixture was prepared from this ITO powder and water. Here, the content of the conductive particles in the aqueous mixture was made to be 1 mass %. The pH of the aqueous mixture was measured using a pH meter, whereupon the pH of the aqueous mixture was 3.0; the chlorine content was below the limit of detection.

Example 1

10 parts by mass of the above ITO powder (conductive particles, mean particle diameter 30 nm) and 33 parts by mass of Denatron 4001 (conductive polymer, solid content 1.5 wt %, made by Nagase Chemtex Corporation, trade name) were mixed together, thus preparing a mixed liquid. The mixed liquid was applied using a bar coating method such that the film thickness after drying would be 10 μm onto a polyethylene terephihalate (PET) film A (baseplate, made by Teijin, thickness 100 μm) that had been coated with an anchor coat (made by Matsushita Electric Works Ltd., trade name Frescera N) in advance.

Next, a PET film B was placed over the surface on which the mixed liquid had been applied, and the applied mixed liquid was compressed with a pressure of 9.8 MPa from above on the surface of the PET film B on the opposite side to the surface of the PET film B that was placed over the mixed liquid. The PET film B was then removed, whereby a compressed layer (conductive layer) was obtained.

Next, 50 parts by mass of an acrylic polymer (binder 13*a*, average molecular weight approximately 100,000 containing average of 25 acryloyl groups and average of 25 triethoxysilane groups per molecule), 30 parts by mass of 2-hydroxy-3-phenoxypropyl acrylate (binder 13*a*, made by Shin-Nakamura Chemical Corporation, trade name: 702A), 5 parts by mass of dipentaerythritol hexaacrylate (binder 13*a*, made by Shin-Nakamura Chemical Corporation, trade name: A-DPH), 15 parts by mass of a urethane-modified acrylate (binder 13*a*, made by Shin-Nakamura Chemical Corporation, trade name: UA-1000H), and 5 parts by mass of a photopolymerization initiator (made by Ciba Specialty Chemicals, trade name: IRGACURE 819) were dispersed in 50 parts by mass of methyl ethyl ketone (MEK) to obtain a dispersion, and this dispersion was applied onto the compressed layer using a bar coating method.

The MEK was evaporated off, and then a 50 mm square glass substrate was stuck onto the surface on which the dispersion had been applied, and irradiation was carried out using a metal halide lamp as a light source with a cumulative dose of 1000 mJ/cm$^2$, thus curing the binders 13*a* to form a binder layer.

The PET film A was then peeled away, whereby a transparent conductor A having therein the conductive layer containing the ITO powder and the conductive polymer, and the binder layer was obtained.

Example 2

A transparent conductor B was obtained through the same procedure as in Example 1, except that the amount of the Denatron 4001 used in Example 1 was changed to 66 parts by mass.

Comparative Example 1

A transparent conductor C was obtained through the same procedure as in Example 1, except that the Denatron 4001 was not used.

[Evaluation Method]

(Evaluation of resistance of transparent conductors) The electrical resistance was evaluated as follows for each of the transparent conductors A to C obtained as above. That is, the electrical resistance value was measured using a 4-terminal 4-probe surface resistance measuring apparatus (MCP-T600 made by Mitsubishi Chemical Corporation) for a preset measurement point on the transparent conductor, and this measured value was taken as the initial electrical resistance. After that, the transparent conductor was left for 1000 hours under a 60° C. 95% RH environment, and then taken out and allowed to cool to room temperature, and then the electrical resistance value was again measured at the measurement point set before the humidification, the measured value being taken as the post-humidification electrical resistance. The change factor was then calculated based on the following formula.

Change factor=post-humidification electrical resistance/initial electrical resistance The results are shown in Table 1.

TABLE 1

| | Initial electrical resistance (Ω/□) | Post-humidification electrical resistance (Ω/□) | Change factor |
|---|---|---|---|
| Example 1 | 246 | 258 | 1.05 |
| Example 2 | 205 | 209 | 1.02 |
| Comparative Example 1 | 584 | 672 | 1.15 |

It can be seen from Table 1 that the change in the electrical resistance was lower for Examples 1 and 2 than for Comparative Example 1, i.e. increase in the electrical resistance could be adequately suppressed. Moreover, it can be seen that the change in the electrical resistance was particularly low for Examples 1 and 2. From the above results, it can be seen that according to the transparent conductor of the present invention, increase in or change over time in the electrical resistance thereof can be adequately suppressed even under a high-humidity environment.

What is claimed is:

1. A transparent conductor used in touch panels, comprising:

a substrate containing at least one material selected from the group consisting of polyester resin, polyolefin resin, polycarbonate resin, norbornene resin, and glass;

a binder layer comprising a binder resin containing at least one material selected from the group comprising acrylic resin and epoxy resin; and a conductive layer containing conductive particles, said binder resin and a conductive polymer, said binder layer being provided between said substrate and said conductive layer, wherein the binder resin in the conductive layer is obtained by curing binder penetrated from said binder layer into said conductive layer.

2. The transparent conductor according to claim 1, wherein said conductive polymer contains at least one compound selected from the group comprising polyacetylenes, polypyrroles, polythiophenes, polyphenylenevinylenes, polyphenylenes, polysilanes, polyfluorenes, and polyanilines.

3. The transparent conductor according to claim 2, wherein said conductive polymer comprises colloidal particles.

4. The transparent conductor according to claim 1, wherein said conductive polymer contains a polythiophene.

5. The transparent conductor according to claim 4, wherein said conductive polymer comprises colloidal particles.

6. The transparent conductor according to claim 4, wherein said polythiophene is a compound represented by general formula (1) below

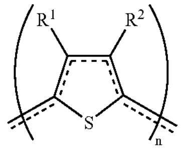

(1)

wherein $R^1$ and $R^2$ each independently represents a hydrogen atom, an optionally substituted hydrocarbon group having 1 to 10 carbon atoms, or an optionally substituted aryl group, or $R^1$ and $R^2$ together represent carbon atoms or hetero atoms constituting a 4- to 20-membered ring; and wherein said hydrocarbon group may be chain or cyclic; said ring may contain hetero atoms in addition to $R^1$ and $R^2$, and said ring may be an aromatic ring; n represents a positive integer.

7. The transparent conductor according to claim 1, wherein said conductive polymer comprises colloidal particles.

8. The transparent conductor according to claim 1, wherein the thickness of said conductive layer is in a range of 50 nm to 5 μm.

9. The transparent conductor according to claim 1, wherein the thickness of said binder layer is in a range of 500 nm to 10 μm.

10. A transparent conductor used in touch panels, comprising:

a substrate containing at least one material selected from the group consisting of polyester resin, polyolefin resin, polycarbonate resin, norbornene resin, and glass;

a binder layer comprising a binder resin containing at least one material selected from the group comprising acrylic resin and epoxy resin; and a conductive layer containing conductive particles, said binder resin and a conductive polymer, said binder layer being provided between said substrate and said conductive layer, wherein said binder resin in said conductive layer and said binder layer are cured simultaneously.

11. A process for manufacturing a transparent conductor used in touch panels, comprising:

coating a liquid comprising binder onto a compressed layer formed by compressing a mixture of conductive particles and conductive polymer;

penetrating said liquid into said compressed layer;

stacking a substrate containing at least one material selected from the group consisting of polyester resin, polyolefin resin, polycarbonate resin, norbornene resin, and glass onto the surface on which said liquid was coated; and forming a conductive layer and a binder layer stacked in this order on said substrate by curing a part of said binder, wherein said binder layer comprises a binder resin containing at least one material selected from the group comprising acrylic resin and epoxy resin said conductive layer containing said conductive particles, said binder resin, and said conductive polymer, said binder layer being provided between said substrate and said conductive layer, and said binder resin in said conductive layer and said binder layer are cured simultaneously.

* * * * *